(12) United States Patent
Kuroiwa

(10) Patent No.: US 7,039,250 B2
(45) Date of Patent: May 2, 2006

(54) ELECTRONIC CAMERA AND IMAGE PROCESSING PROGRAM

(75) Inventor: Toshihisa Kuroiwa, Miura (JP)

(73) Assignee: Nikon Corporation, Tokyo (JP)

( * ) Notice: Subject to any disclaimer, the term of this patent is extended or adjusted under 35 U.S.C. 154(b) by 913 days.

(21) Appl. No.: 10/067,211

(22) Filed: Feb. 7, 2002

(65) Prior Publication Data

US 2002/0109779 A1 Aug. 15, 2002

(30) Foreign Application Priority Data

Feb. 15, 2001 (JP) .............................. 2001-038737

(51) Int. Cl.
*G06K 9/36* (2006.01)

(52) U.S. Cl. ...................... 382/248; 382/232; 382/240; 382/250

(58) Field of Classification Search ................ 382/232, 382/233, 240, 236, 238, 239, 248, 252, 250; 375/240.03, 240.04, 240.05; 348/333.03, 348/384.1, 394.1; 396/121
See application file for complete search history.

(56) References Cited

U.S. PATENT DOCUMENTS

| | | | |
|---|---|---|---|
| 5,043,816 A | 8/1991 | Nakano et al. .......... | 348/333.1 |
| 5,111,306 A | 5/1992 | Kanno et al. ................ | 358/403 |
| 5,359,382 A | 10/1994 | Uenaka ........................ | 396/95 |
| 5,359,676 A | 10/1994 | Fan ............................. | 382/246 |
| 5,479,211 A | 12/1995 | Fukuda ................... | 375/240.03 |
| 5,594,554 A | 1/1997 | Farkash et al. ............. | 382/248 |
| 5,842,059 A | 11/1998 | Suda ........................ | 396/101 |
| 5,920,349 A | 7/1999 | Okino et al. ................. | 348/354 |
| 6,125,201 A | 9/2000 | Zador .......................... | 382/166 |
| 6,415,057 B1 | 7/2002 | Suzuki et al. ............... | 382/239 |
| 6,697,529 B1 | 2/2004 | Kuniba ........................ | 382/239 |
| 6,917,384 B1 * | 7/2005 | Fukushima ............ | 348/333.03 |
| 2003/0193610 A1 | 10/2003 | Nozaiki et al. ............. | 348/345 |
| 2005/0219666 A1 | 10/2005 | Ejima et al. ................. | 358/539 |

FOREIGN PATENT DOCUMENTS

| | | |
|---|---|---|
| JP | A-04-220879 | 8/1992 |
| JP | A-11-136557 | 5/1999 |

* cited by examiner

*Primary Examiner*—Anh Hong Do
(74) *Attorney, Agent, or Firm*—Oliff & Berridge, PLC

(57) ABSTRACT

The invention provides a technique for compression processing according to JPEG 2000 or the like in an electronic camera that evaluates the quality of each of image data groups taken sequentially by an imaging section and records high-rank image data selectively, and in a related image processing program. The quality of an image is evaluated based on: an amount of data in a selection region of ROI coding; an amount of data to a predetermined position of a bit stream; a cutoff position of a bit stream; a signal level of a high-frequency-range sub-band component; or an amount of data of a predetermined tile. This quality evaluation makes it possible to achieve an image selection function that matches the compression processing of JPEG 2000 or the like very well.

28 Claims, 6 Drawing Sheets

ELECTRONIC CAMERA AND IMAGE PROCESSING PROGRAM

BACKGROUND OF THE INVENTION

1. Field of the Invention

The present invention relates to an electronic camera that image-evaluates image data groups produced by sequential shooting and selectively stores highly evaluated image data.

The invention also relates to an image processing program for executing with a computer a process of image-evaluating image data groups produced by sequential shooting and selectively storing highly evaluated image data.

2. Description of the Related Art

Electronic cameras having a BSS (best shot selector) mode are known. The BSS mode is an operation mode in which image data having a large amount of image information is selected from image data groups produced by sequential shooting and the selected image data is stored. The use of the BSS mode makes it possible to selectively store clear image data with a low degree of hand blurring and a small focusing error.

Incidentally, a novel image compression method called JPEG 2000 was proposed recently. The processing procedure of JPEG 2000 will be outlined below.

(1) Color Coordinate Transform

An input image is subjected to color coordinate transport when necessary.

(2) Wavelet Transform

The image is subjected to discrete wavelet transform in two directions, that is, in the vertical and horizontal directions, whereby the image is frequency-divided into a plurality of sub-bands (LL, LH, HL, and HH). The discrete wavelet transform is performed repeatedly (recursively) on the LL-band (lowest frequency range) component.

(3) Quantization

Wavelet transform coefficients are quantized for each sub-band. In a lossy/lossless-unified processing, the quantization step is set at "1" initially. In this case, in lossy compression, lower N bit planes are discarded in a later step. This discard processing is equivalent to processing in which the quantization step is equal to $2^N$.

(4) Bit modeling

Quantized wavelet transform coefficients are divided into coding blocks having a fixed size (e.g., 64×64) in each sub-band. Each of transform coefficients in each coding block is divided into a sign and an absolute value, and the absolute values are assigned to bit planes of natural binary numbers. The bit planes thus constructed are coded in order, starting from the highest bit plane through three kinds of coding passes (significance pass, refinement pass, and cleanup pass). Each sign bit is coded immediately after the MSB of the corresponding absolute value appears on the bit plane.

(5) ROI (region of interest) coding

This is a function of preferentially allocating an information amount to a selection region of an image and thereby increasing decoding quality in the selection region. Specifically, the above-described bit modeling is performed after shifting up, by S bits, quantized transform coefficients located in the selection region. As a result, the transform coefficients in the selection region are shifted to higher bit planes and coded with priority over any bit in the non-selection region.

In a max shift method, the bit shift number S is set larger than the bit number of the MSB in the non-selection region. Therefore, non-zero transform coefficients in the selection region are necessarily greater than or equal to $2^s$. In decoding, the transform coefficients in the selection region can easily be reproduced by selectively shifting down quantized values that are greater than or equal to $2^s$.

(6) Arithmetic coding (7) Bit stream formatting

A bit stream according to the SNR progressive scheme, the spatial resolution progressive scheme, or the like is realized by arranging data of each coding block according to a combination of four axes (bit plane importance, spatial resolution, block position, and color components).

For example, in the case of the SNR progressive scheme, a plurality of layers are constructed by dividing each coding block by the coding passes and classifying divisional data in order of the degree of contribution to SNR increase. An SNR progressive bit stream is formed by arranging the layers in order, starting from the top-rank layer. Fixed-length compression is realized by cutting off the bit stream at a proper file size.

A compressed image file according to JPEG 2000 is generated according to the above coding procedure.

One can correctly know the latest version of JPEG 2000 by referring to the final committee draft that is publicized by the JPEG committee over the Internet (httf://wwwjpeg.org/fcd 15444-1.zip). One can know a more detailed and correct international standard (approved recently) through standardization organizations such as ISO and ITU-T.

In JPEG 2000, it is difficult to use the conventional BSS mode as it is, because the above-described processing procedure of JPEG 2000 is much different from the processing procedures of conventional image compression methods (e.g., JPEG).

SUMMARY OF THE INVENTION

An object of the present invention is to provide a BSS mode suitable for compression processing of JPEG 2000 or the like.

The invention will be summarized below.

(1) An electronic camera of the invention comprises an imaging section for generating a plurality of image data by shooting an object sequentially; a frequency dividing section for frequency-dividing each of the plurality of image data generated by the imaging section and thereby converting the image data into transform coefficients; a coding section for dividing the transform coefficients produced by the frequency dividing section into transform coefficients in a selection region and transform coefficients in a non-selection region, and for generating a compressed file by allocating an information amount preferentially to the selection region to the non-selection region and coding the transform coefficients in the selection region, the selection region being determined in advance and the non-selection region being a region other than the selection region; an image evaluation section for comparing data amounts of the coded transform coefficients in the selection region for the plurality of image data, the data amounts being hereinafter to be referred to as ROI data mounts, and for selecting image data having a large ROI data amount; and a recording section for recording the compressed file of the image data selected by the image evaluation section.

In the electronic camera having the above configuration, image data having a large ROI data amount (an amount of compressed data in the selection region) is selected from image data groups produced by sequential shooting, and the selected image data is stored.

The image data selected in this manner has a high quality because of its plenty of image information in the selection region.

In particular, an area including a main object is often determined as the selection region in the screen since the compression deteriorates image quality a little in the selection region. In this case, it becomes possible to selectively store clear image data of the main object.

Since an information amount is allocated preferentially to the selection region, there is a little probability that a bit stream is cut off halfway in the selection region. Therefore, cutoff of a bit stream have almost no affects on the ROI data amount, and hence the ROI data amounts correctly reflects the information amount of the image. As a result, accurate image evaluation can be performed by evaluating the ROI data amount.

Moreover, preferentially allocating an information amount to the selection region makes it possible to determine an ROI data amount at a relatively early stage of an image compression process. Therefore, ROI data can be compared with each other before completion of the image compression process, which realizes an increase in the processing speed of a BSS mode operation easily.

(2) Another electronic camera of the invention comprises an imaging section for generating a plurality of image data by shooting an object sequentially; a frequency dividing section for frequency-dividing each of the plurality of image data generated by the imaging section and thereby converting the image data into transform coefficients; a coding section for coding the transform coefficients produced by the frequency dividing section into coded data, and for generating a bit stream of a compressed file by arranging the coded data in predetermined order of priority; an image evaluation section for comparing amounts of data included in predetermined starting positions to predetermined positions of the bit streams generated by the coding section, for the plurality of image data, the amounts of data being hereinafter referred to as interim data mounts, and for selecting image data having a large interim data amount; and a recording section for recording the compressed file of the image data selected by the image evaluation section.

In the electronic camera having the above configuration, image data having a large amount of data (an interim data amount) included in the predetermined starting positions to the predetermined position of a bit stream, is selectively stored from image data groups produced by sequential shooting.

The image data selected in this manner has a high quality because the bit stream at the predetermined position contains abundant image information.

There is a little probability that a bit stream is cut off halfway unless the predetermined position of a bit stream is set far from its beginning. Therefore, cutoff of a bit stream has almost no affects on the interim data amount, and hence the interim data amount correctly reflects the information amount of the image. As a result, accurate image evaluation can be performed by evaluating the interim data amount.

An interim data amount can be determined at a stage when a bit stream has been formed up to the predetermined position. Therefore, interim data can be compared with each other before completion of an image compression process, which makes it possible to increase the processing speed of a BSS mode operation easily.

(3) Another electronic camera of the invention comprises an imaging section for generating a plurality of image data by shooting an object sequentially; a frequency dividing section for frequency-dividing each of the plurality of image data generated by the imaging section and thereby converting the image data into transform coefficients; a coding section for coding the transform coefficients produced by the frequency dividing section into coded data, and for generating a bit stream of a compressed file by arranging the coded data in predetermined priority order and cutting off the bit stream according to a target data amount; an image evaluation section for comparing cutoff positions of the bit streams generated by the coding section, for the plurality of image data, and for selecting image data whose bit stream has been cut off at a position close to the beginning of the bit stream; and a recording section for recording the compressed file of the image data selected by the image evaluation section.

In the electronic camera having the above configuration, image data with its bit stream cut off at a position close to the beginning is selectively stored from image data groups produced by sequential shooting.

The image data selected in this manner has a high quality because of its abundant image information.

Since a cutoff position can be determined when a bit stream is cut off, cutoff positions can be compared with each other before completion of generation of a compressed file, which makes it possible to increase the processing speed of a BSS mode operation easily.

(4) The still another electronic camera of the invention comprises an imaging section for generating a plurality of image data by shooting an object sequentially; a frequency dividing section for dividing each of the plurality of image data generated by the imaging section into sub-bands and thereby converting the image data into transform coefficients; a coding section for generating a compressed file by coding the transform coefficients produced by the frequency dividing section; an image evaluation section for comparing signal levels in high-frequency-range sub-bands of the produced transform coefficients for the plurality of image data, and for selecting image data having a high signal level; and a recording section for recording the compressed file of the image data selected by the image evaluation section.

In the electronic camera having the above configuration, image data having a high signal level in a high-frequency-range sub-band is selectively stored from image data groups produced by sequential shooting.

Image data selected in this manner is high-quality image data having large undulation in the high-frequency-range sub-band.

A signal level in the high-frequency-range sub-band is determined at the stage of sub-band division during an image compression process so that comparing signal levels in high-frequency-range sub-bands with each other is enabled before completion of the image compression process, which realizes an increase in the processing speed of a BSS mode operation easily.

(5) A further electronic camera of the invention comprises an imaging section for generating a plurality of image data by shooting an object sequentially; a frequency dividing section for dividing each of the plurality of image data generated by the imaging section into a plurality of tiles in an image space, and for frequency-dividing the tiles and thereby converting the tiles into transform coefficients; a coding section for coding the transform coefficients produced by the frequency dividing section into coded data, and for generating a compressed file by gathering the coded data of the tiles; an image evaluation section for comparing coded data amounts of predetermined tiles for the plurality of image data, the coded data amounts being hereinafter referred to as tile data amounts, and for selecting image data having a large tile data amount; and a recording section for recording the compressed file of the image data selected by the image evaluation section.

In the electronic camera having the above configuration, image data having a large coded data amount of a predetermined tile (a tile data amount) is selectively stored from image data groups produced by sequential shooting.

Image data selected in this manner is high-quality image data having abundant image information in the predetermined tile.

By selecting, as the predetermined tile, a screen region where a main object exists at a high probability (e.g., a region at the screen center or a golden section position), clear image data of a main object can be selectively stored, especially.

Individual tiles are subjected to image compression processing independently. Therefore, preferentially processing a predetermined tile makes it possible to determine a tile data amount at a relatively early stage of the image compression process. Tile data amounts can be compared with each other before completion of the image compression process, which makes it possible to increase the processing speed of a BSS operation easily.

(6) In the electronic camera according to any of items (1)–(5), upon deciding not to select the image data being under evaluation, the image evaluation section allows the coding section to stop generating a compressed file of the image data being under evaluation.

In the electronic camera having the above configuration, if it is decided that the image data being under evaluation should not be selected, the compression processing on the image data stops. This prevents unnecessary compression processing and hence makes it possible to increase the processing speed of a BSS operation easily.

(7) The invention provides an image processing program for processing, with a computer, a plurality of image data generated by sequential shooting with an imaging section in an electronic camera or the like. The image processing program causes the computer to function as the frequency dividing section, coding section, image evaluation section, and recording section described in any of items (1)–(6).

By executing the above image processing program with a computer, the same process as executed in the electronic camera according to any of items (1)–(6) can be executed on image data groups produced by sequential shooting.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Embodiments of the present invention will be hereinafter described.

Figure 1:
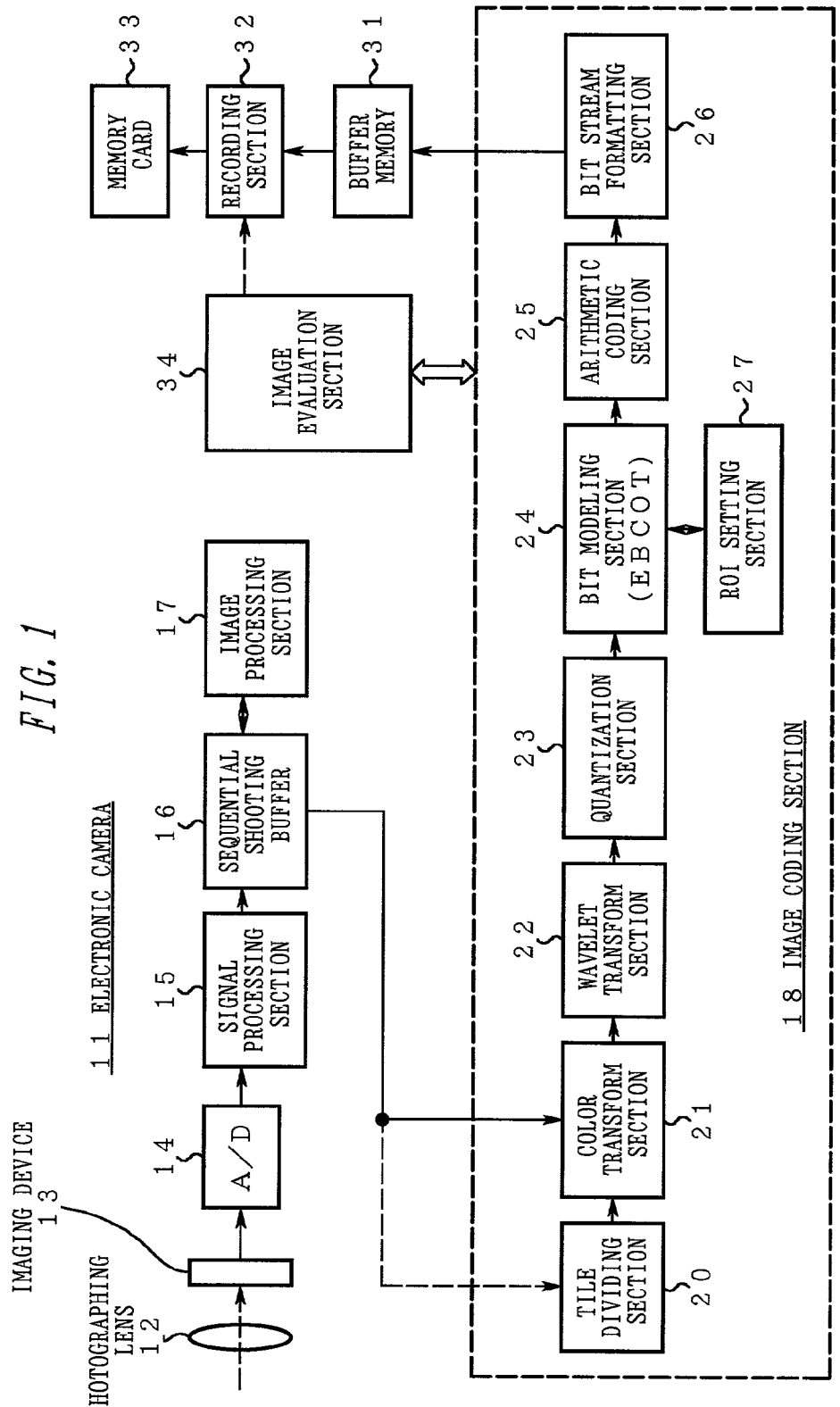
FIG. 1 is a block diagram showing the configuration of an electronic camera 11.

FIG. 1 is a block diagram showing the configuration of an electronic camera 11.

As shown in FIG. 1, the electronic camera 11 is mounted with a photographing lens 12. The imaging surface of an imaging device 13 is disposed in the image space of the photographing lens 12. The imaging device 13 photoelectrically converts an object image into image data. The image data is digitized by an A/D conversion section 14 and then supplied to a signal processing section 15. The signal processing section 15 performs real-time processing such as black level correction and gray scale transform on the image data. The image data that has been subjected to the real-time processing is temporarily stored in a sequential shooting buffer 16. During sequential shooting, the sequential shooting buffer 16 accumulates image data of a plurality of frames in order. An image processing section 17 and an image coding section 18 are connected to the sequential shooting buffer 16.

The image coding section 18 performs compression coding that is prescribed by JPEG 2000. The image coding section 18 is composed of the following sections:

(1) Tile dividing section 20
(2) Color transform section 21
(3) Wavelet transform section 22
(4) Quantization section 23
(5) Bit modeling section 24
(6) Arithmetic coding section 25
(7) Bit stream formatting section 26
(8) ROI setting section 27

A compressed file that is output from the image coding section 18 is temporarily stored in a buffer memory 31. A recording section 32 stores the compressed file of the buffer memory 31 in a memory card 33.

An image evaluation section 34 such as a microprocessor performs image evaluation by acquiring compression process information from the image coding section 18 and controls the image coding section 18, the buffer memory 31, and the recording section 32 so that high-quality image data is stored selectively.

The image evaluation section 34 can selectively perform first to fifth BSS mode operations (described later).

Correspondence to Claim Elements

A corresponding relationship between the components of the above-described electronic camera 11 and the claim elements will be described below. The following corresponding relationship is just an example according to one interpretation and is intended for reference only, and should not be used for restricting the invention unduly.

The imaging section in the claims corresponds to the photographing lens 12, the imaging device 13, and A/D conversion section 14, and the sequential shooting buffer 16.

The frequency dividing section in the claims corresponds to the tile dividing section 20, the color transform section 21, and the wavelet conversion section 22.

The coding section in the claims corresponds to the quantization section 23, the bit modeling section 24, the arithmetic coding section 25, the bit stream formatting section 26, and the ROI setting section 27.

The image evaluation section in the claims corresponds to the image evaluation section 34.

The recording section in the claims corresponds to the recording section 32.

Next, individual BSS mode processes will be described in detail.

First BSS Mode

Figure 2:
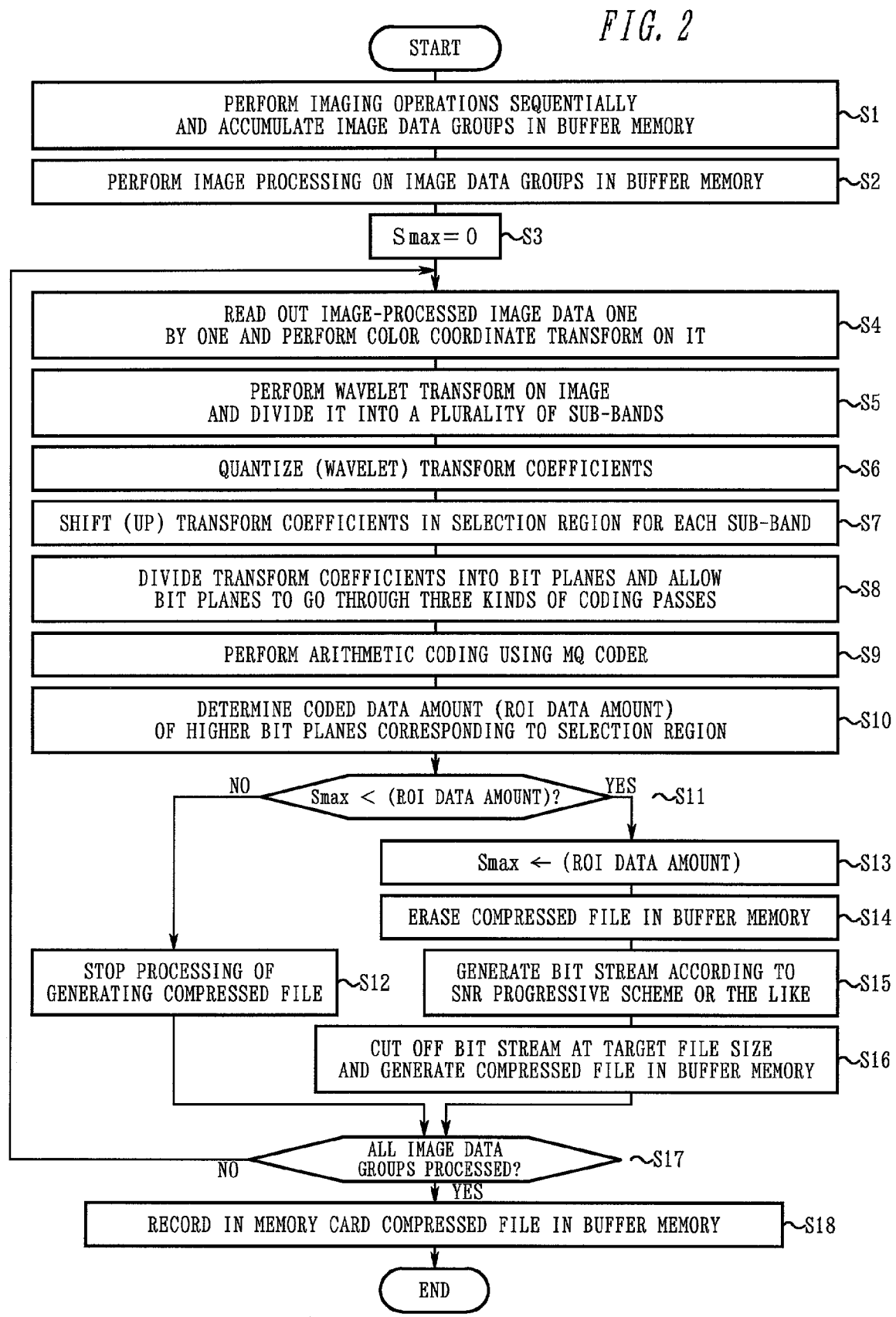
FIGS. 2–6 are flowcharts showing first to fifth BSS mode processes, respectively.

FIG. 2 is a flowchart showing a first BSS mode process. The first BSS mode process will be described below in order of step numbers shown in FIG. 2.

Step S1: In response to a release manipulation of a user, the imaging device 13 performs imaging operations sequentially. Image data groups that are output from the imaging device 13 are supplied, via the A/D conversion section 14, to the signal processing section 15, where they are subjected to real-time processing. Resulting image data groups are stored in the sequential shooting buffer 16 in order.

Step S2: The image processing section 17 performs two-dimensional image processing such as color interpolation processing on the image data groups in the sequential shooting buffer 16 in order.

Step S3: The image evaluation section 34 initially sets an evaluation reference value Smax at zero.

Step S4: The color transform section 21 reads image data that have been subjected to the two-dimensional image processing from the sequential shooting buffer 16 in every processing. The color transform section 21 performs color coordinate transform on the read-out image data and thereby converts it into color components such as YCbCr.

Step S5: The wavelet transform section 22 acquires image data that have been subjected to the color coordinate transform, in every processing. The wavelet transform section 22 performs wavelet transform on the acquired image data recursively and calculates transform coefficients (i.e., sub-band components).

Step S6: The quantization section 23 quantizes the transform coefficients if necessary.

Step S7: The bit modeling section 24 reads out a mask image of a selection region that is preset in the ROI setting section 27. Based on the mask image of the selection region, the bit modeling section 24 judges, for each sub-band, whether the transform coefficients are included in the selection region. The bit modeling section 24 shifts up transform coefficients that are located in the selection region by S bits. The number S of bits is a number determined according to the max shift method.

Step S8: The bit modeling section 24 divides the transform coefficients into bit 5 planes. At this time, the transform coefficients in the selection region are assigned to higher bit planes. The bit modeling section 24 causes the bit planes to go through three kinds of coding passes in order, starting from the highest bit plane.

Step S9: The arithmetic coding section 25 acquires coded data from the bit modeling section 24, in every processing. The arithmetic coding section 25 performs arithmetic coding on the coded data using an MQ coder which is a binary arithmetic coder.

Step S10: The image evaluation section 34 acquires, from the arithmetic coding section 25, information indicating an amount of data (hereinafter referred to as "ROI data amount") of the higher bit planes corresponding to the selection region as subjected to the arithmetic coding.

Step S11: The image evaluation section 34 compares the ROI data amount with the evaluation reference value Smax.

If the ROI data amount is smaller than or equal to the evaluation reference value Smax, the image evaluation section 34 proceeds to step S12.

On the other hand, if the ROI data amount is larger than the evaluation reference value Smax, the image evaluation section 34 proceeds to step S13.

Step S12: The image evaluation section 34 judges that the image is defective, because the ROI data amount of the image data being under compression is small. The image evaluation section 34 instructs the image coding section 18 to stop the processing of generating a compressed file. In response to the stop instruction, the image coding section 18 initializes an internal processing buffer (not shown) etc. to prepare for the next compression coding operation. After issuing the stop instruction, the image evaluation section 34 proceeds to step S17.

Step S13: The image evaluation section 34 judges that the image is a best image at this point, because the ROI data amount of the image data being under compression is large. The image evaluation section 34 substitutes the ROI image data amount into the evaluation reference value Smax to prepare for the next evaluation.

Step S14: Since the new best image has occurred, the image evaluation section 34 erases or invalidates the compressed file (e.g., the past best image) in the buffer memory 31. Alternatively, the lowest-rank compressed file may be removed from a predetermined number of compressed files in the buffer memory 31.

Step S15: The bit stream formatting section 26 acquires processed coded data from the arithmetic coding section 25, in every processing. The bit stream formatting section 26 rearranges the coded data according to the SNR progressive scheme or some other priority ordering scheme and thereby generates a bit stream.

Step S16: The bit stream formatting section 26 cuts off the bit stream so that it fits in a target file size that is determined by a selected image quality mode. The bit stream formatting section 26 generates a compressed file in the buffer memory 31 based on the cut-off bit stream.

Step S17: The image evaluation section 34 judges whether the evaluation operation has completed for all the image data groups in the sequential shooting buffer 16.

If the evaluation operation has not completed yet for all the image data groups, the image evaluation section 34 returns to step S4.

On the other hand, if the evaluation operation has completed for all the image data groups, the image evaluation section 34 proceeds to step S18.

Step S18: The image evaluation section 34 instructs the recording section 32 to perform recording processing on the compressed file existing in the buffer memory 31. The recording section 32 stores, in the memory card 33, the compressed file (i.e., the surviving, high-rank image) existing in the buffer memory 31.

The first BSS mode process completes after execution of the above series of steps.

Second BSS Mode

Figure 3:
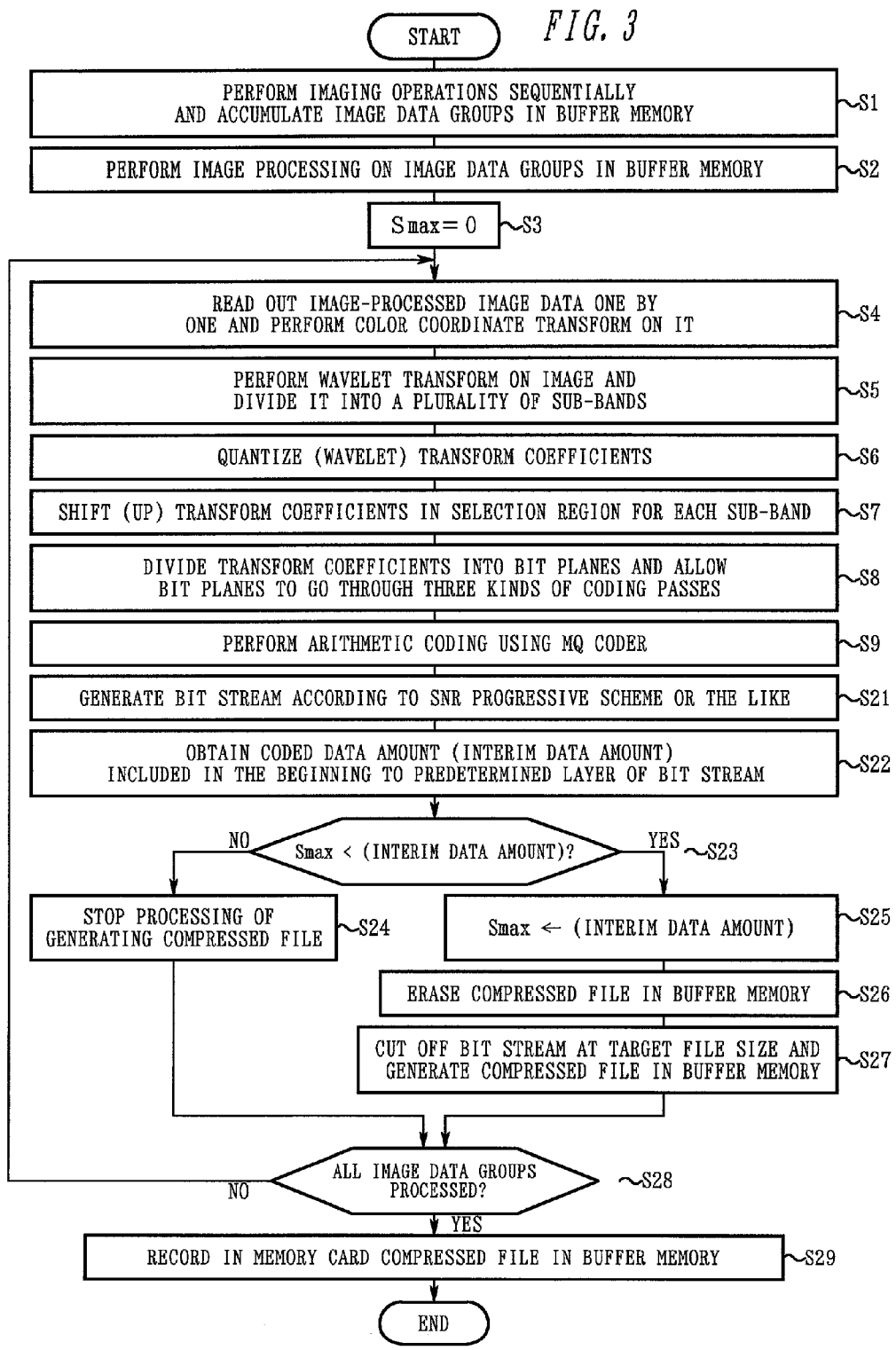

FIG. 3 is a flowchart showing a second BSS mode process. The second BSS mode process will be described below in order of step numbers shown in FIG. 3.

Steps S1–S9: Steps S1–S9 are the same as in the first BSS mode process (FIG. 2) and hence will not be described.

Step S21: The bit stream formatting section 26 acquires processed coded data from the arithmetic coding section 25, in every processing. The bit stream formatting section 26 rearranges the coded data according to the SNR progressive scheme or some other priority ordering scheme and thereby generates a bit stream.

Step S22: The image evaluation section 34 acquires, from the bit stream formatting section 26, information indicating an amount of coded data (hereinafter referred to as "interim data amount") which is included in a predetermined starting position (for example, the beginning) to a predetermined layer of the bit stream.

Step S23: The image evaluation section 34 compares the interim data amount with the evaluation reference value Smax.

If the interim data amount is smaller than or equal to the evaluation reference value Smax, the image evaluation section 34 proceeds to step S24.

On the other hand, if the interim data amount is larger than the evaluation reference value Smax, the image evaluation section 34 proceeds to step S25.

Step S24: The image evaluation section 34 judges that the image is a defective image, because the interim data amount of the image data being under compression is small. The image evaluation section 34 instructs the image coding section 18 to stop the processing of generating a compressed file. In response to the stop instruction, the image coding section 18 initializes the internal processing buffer (not shown) etc. to prepare for the next compression coding operation. After issuing the stop instruction, the image evaluation section 34 proceeds to step S28.

Step S25: The image evaluation section 34 judges that the image is a best image at this point, because the interim data amount of the image data being under compression is large. The image evaluation section 34 substitutes the interim image data amount into the evaluation reference value Smax to prepare for the next evaluation.

Step S26: Since the new best image has occurred, the image evaluation section 34 erases or invalidates the compressed file (e.g., the past best image) in the buffer memory 31. Alternatively, the lowest-rank compressed file may be removed from a predetermined number of compressed files in the buffer memory 31.

Step S27: The bit stream formatting section 26 cuts off the bit stream so that it fits in a target file size that is determined by a selected image quality mode. The bit stream formatting section 26 generates a compressed file in the buffer memory 31 based on the cut-off bit stream.

Step S28: The image evaluation section 34 judges whether the evaluation operation has completed for all the image data groups in the sequential shooting buffer 16.

If the evaluation operation has not completed yet for all the image data groups, the image evaluation section 34 returns to step S4.

On the other hand, if the evaluation operation has completed for all the image data groups, the image evaluation section 34 proceeds to step S29.

Step S29: The image evaluation section 34 instructs the recording section 32 to perform recording processing on the compressed file existing in the buffer memory 31. The recording section 32 stores, in the memory card 33, the compressed file (i.e., the surviving, high-rank image) existing in the buffer memory 31.

The second BSS mode process completes after execution of the above series of steps.

Third BSS Mode

Figure 4:
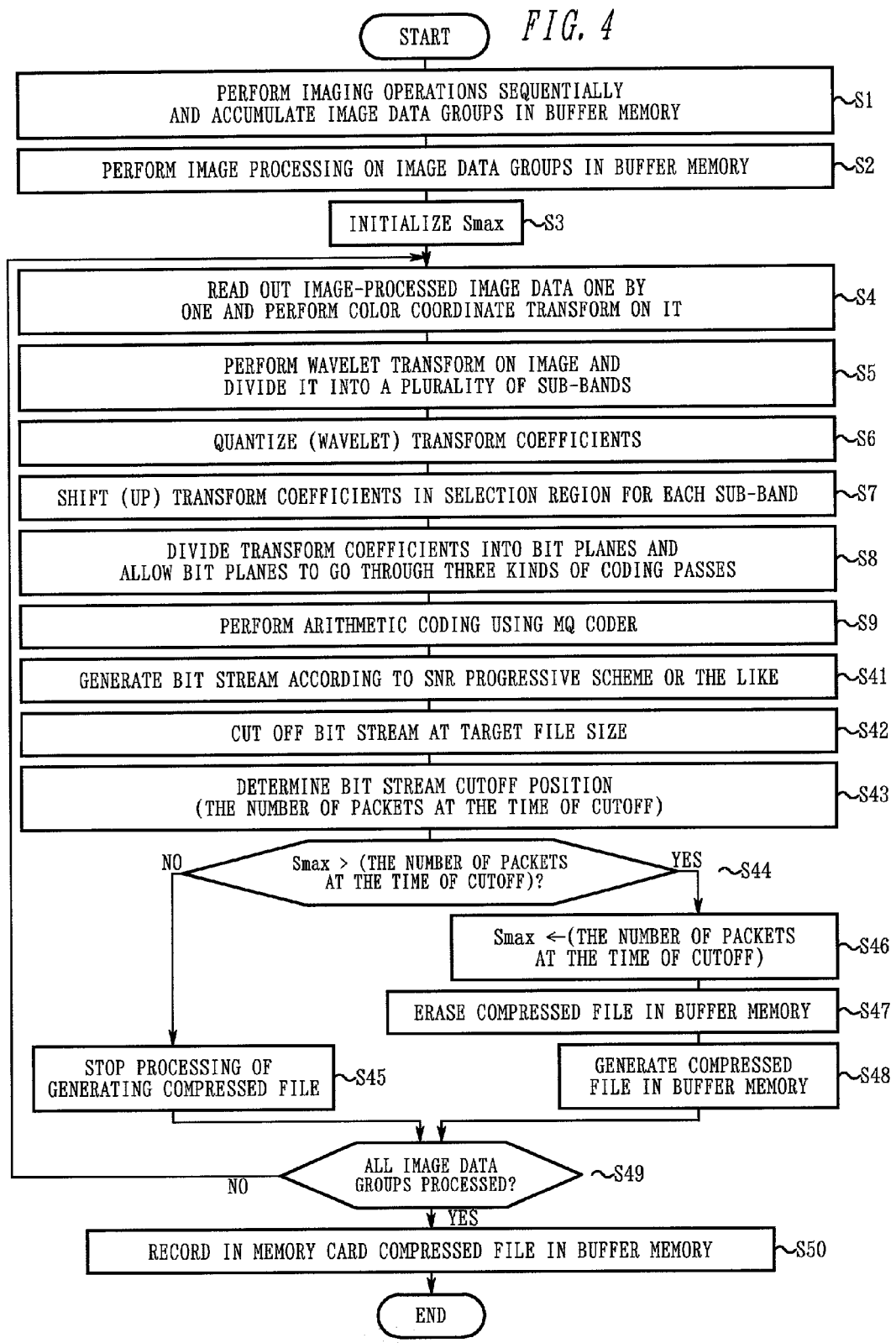

FIG. 4 is a flowchart showing a third BSS mode process. The third BSS mode process will be described below in order of step numbers shown in FIG. 4.

Steps S1–S9: Steps S1–S9 are the same as in the first BSS mode process (FIG. 2) and hence will not be described. However, at step S3, the image evaluation section 34 initially sets the evaluation reference value Smax at a proper value (a sufficiently large value).

Step S41: The bit stream formatting section 26 acquires processed coded data from the arithmetic coding section 25, in every processing. The bit stream formatting section 26 rearranges the coded data according to the SNR progressive scheme or some other priority ordering scheme and thereby generates a bit stream.

Step S42: The bit stream formatting section 26 cuts off the bit stream so that it fits in a target file size that is determined by a selected image quality mode.

Step S43: The image evaluation section 34 acquires, from the bit stream formatting section 26, as a bit stream cutoff position, information indicating the number of packets at the time point when cutting-off of the bit stream was decided. Actually, the bit stream is cut off in large units, that is, in layers. However, in this process, to compare cutoff positions in smaller units than in layers, the number of packets at the time point when the cutting-off of the bit stream was decided is used.

Step S44: The image evaluation section 34 compares the number of packets with the evaluation reference value Smax.

If the number of packets is smaller than the evaluation reference value Smax, the image evaluation section 34 proceeds to step S46.

On the other hand, if the number of packets is larger than or equal to the evaluation reference value Smax, the image evaluation section 34 proceeds to step S45.

Step S45: The image evaluation section 34 judges that the image is a defective image, because the cutoff position of the image data being under compression is distant from the beginning of the bit stream. The image evaluation section 34 instructs the image coding section 18 to stop the processing of generating a compressed file. In response to the stop instruction, the image coding section 18 initializes the internal processing buffer (not shown) etc. to prepare for the next compression coding operation. After issuing the stop instruction, the image evaluation section 34 proceeds to step S49.

Step S46: The image evaluation section 34 judges that the image is a best image at this point, because the cutoff position of the image data being under compression is closest to the beginning of the bit stream. The image evaluation section 34 substitutes the number of packets into the evaluation reference value Smax to prepare for the next evaluation.

Step S47: Since the new best image has occurred, the image evaluation section 34 erases or invalidates the compressed file (e.g., the past best image) in the buffer memory 31. Alternatively, the lowest-rank compressed file may be removed from a predetermined number of compressed files in the buffer memory 31.

Step S48: The bit stream formatting section 26 generates a compressed file in the buffer memory 31 based on the cut-off bit stream.

Step S49: The image evaluation section 34 judges whether the evaluation operation has completed for all the image data groups in the sequential shooting buffer 16.

If the evaluation operation has not completed yet for all the image data groups, the image evaluation section 34 returns to step S4.

On the other hand, if the evaluation operation has completed for all the image data groups, the image evaluation section 34 proceeds to step S50.

Step S50: The image evaluation section 34 instructs the recording section 32 to perform recording processing on the compressed file existing in the buffer memory 31. The recording section 32 stores, in the memory card 33, the compressed file (i.e., the surviving, high-rank image) existing in the buffer memory 31.

The third BSS mode process completes after execution of the above series of steps.

Fourth BSS Mode Process

Figure 5:
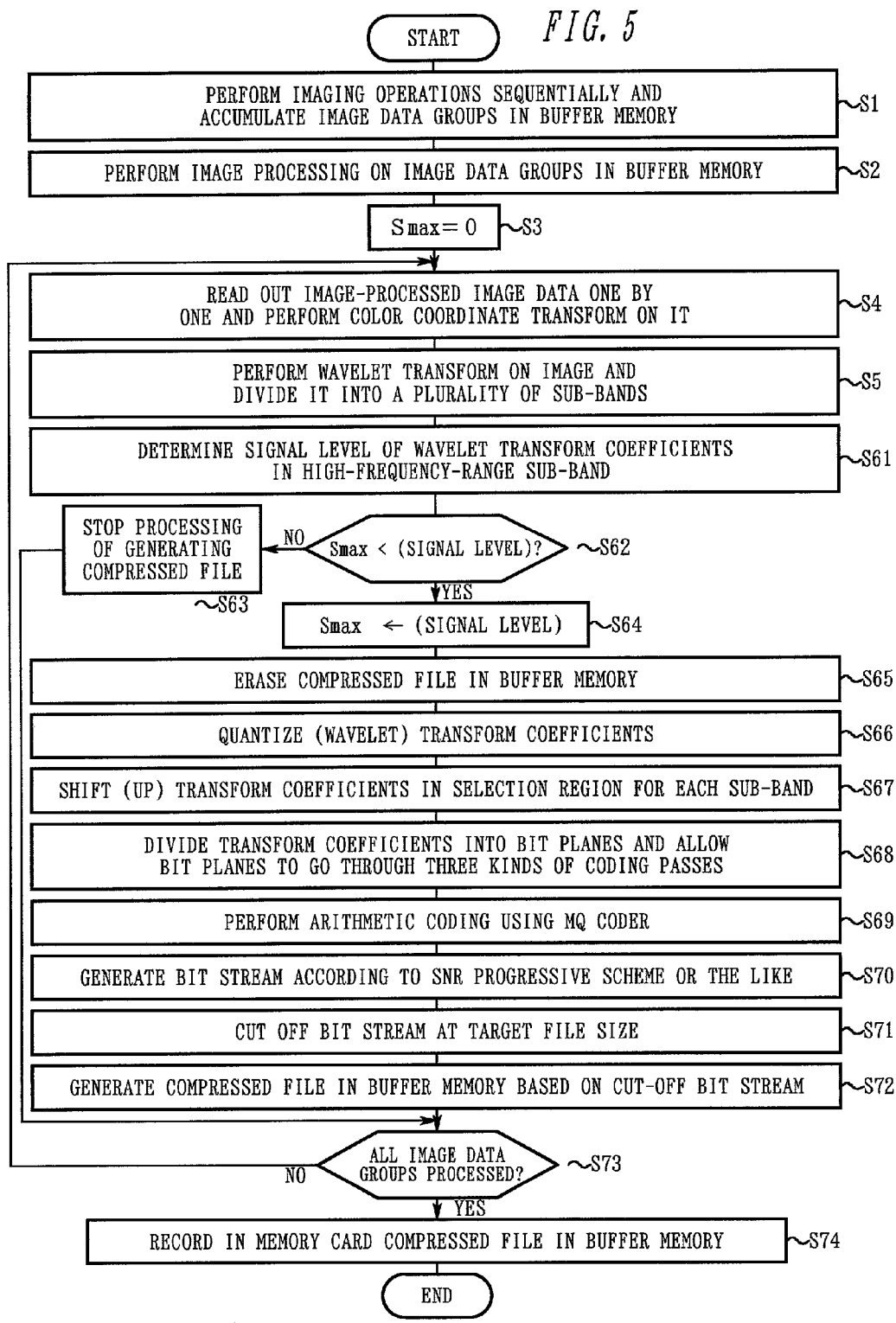

FIG. 5 is a flowchart showing a fourth BSS mode process. The fourth BSS mode process will be described below in order of step numbers shown in FIG. 5.

Steps S1–S5: Steps S1–S5 are the same as in the first BSS mode process (FIG. 2) and hence will not be described.

Step S61: The image evaluation section 34 acquires information of the wavelet transform coefficients of the high-frequency-range sub-band and calculates their signal level (e.g., an average of the squares of the transform coefficients, an average of their absolute values, a maximum amplitude, an average amplitude, or the like).

Step S62: The image evaluation section 34 compares the signal level with the evaluation reference value Smax.

If the signal level is lower than or equal to the evaluation reference value Smax, the image evaluation section 34 proceeds to step S63.

On the other hand, if the signal level is higher than the evaluation reference value Smax, the image evaluation section 34 proceeds to step S64.

Step S63: The image evaluation section 34 judges that the image is a defective image, because the signal level of high-frequency-range sub-band of the image data being under compression is low. The image evaluation section 34 instructs the image coding section 18 to stop the processing of generating a compressed file. In response to the stop instruction, the image coding section 18 initializes the internal processing buffer (not shown) etc. to prepare for the next compression coding operation. After issuing the stop instruction, the image evaluation section 34 proceeds to step S73.

Step S64: The image evaluation section 34 judges that the image is a best image at this point, because the signal level of the high-frequency range sub-band of the image data being under compression is high. The image evaluation section 34 substitutes the signal level into the evaluation reference value Smax to prepare for the next evaluation.

Step S65: Since the new best image has occurred, the image evaluation section 34 erases or invalidates the compressed file (e.g., the past best image) in the buffer memory 31. Alternatively, the lowest-rank compressed file may be removed from a predetermined number of compressed files in the buffer memory 31.

Step S66: The quantization section 23 quantizes the transform coefficients if necessary.

Step S67: The bit modeling section 24 reads out a mask image of a selection region that is preset in the ROI setting section 27. Based on the mask image of the selection region, the bit modeling section 24 judges, for each sub-band, whether the transform coefficients are included in the selection region. The bit modeling section 24 shifts up transform coefficients that are located in the selection region by S bits.

Step S68: The bit modeling section 24 divides the transform coefficients into bit planes. The bit modeling section 24 causes the bit planes to go through three kinds of coding passes in order, starting from the highest bit plane.

Step S69: The arithmetic coding section 25 acquires processed coded data from the bit modeling section 24, in every processing. The arithmetic coding section 25 performs arithmetic coding on the coded data using an MQ coder which is a binary arithmetic coder.

Step S70: The bit stream formatting section 26 acquires processed coded data from the arithmetic coding section 25, in every processing. The bit stream formatting section 26 rearranges the coded data according to the SNR progressive scheme or some other priority ordering scheme and thereby generates a bit stream.

Step S71: The bit stream formatting section 26 cuts off the bit stream so that it fits in a target file size that is determined by a selected image quality mode.

Step S72: The bit stream formatting section 26 generates a compressed file in the buffer memory 31 based on the cut-off bit stream.

Step S73: The image evaluation section 34 judges whether the evaluation operation has completed for all the image data groups in the sequential shooting buffer 16.

If the evaluation operation has not completed yet for all the image data groups, the image evaluation section 34 returns to step S4.

On the other hand, if the evaluation operation has completed for all the image data groups, the image evaluation section 34 proceeds to step S74.

Step S74: The image evaluation section 34 instructs the recording section 32 to perform recording processing on the compressed file existing in the buffer memory 31. The recording section 32 stores, in the memory card 33, the compressed file (i.e., the surviving, high-rank image) existing in the buffer memory 31.

The fourth BSS mode process completes after execution of the above series of steps.

Fifth BSS Mode

Figure 6:
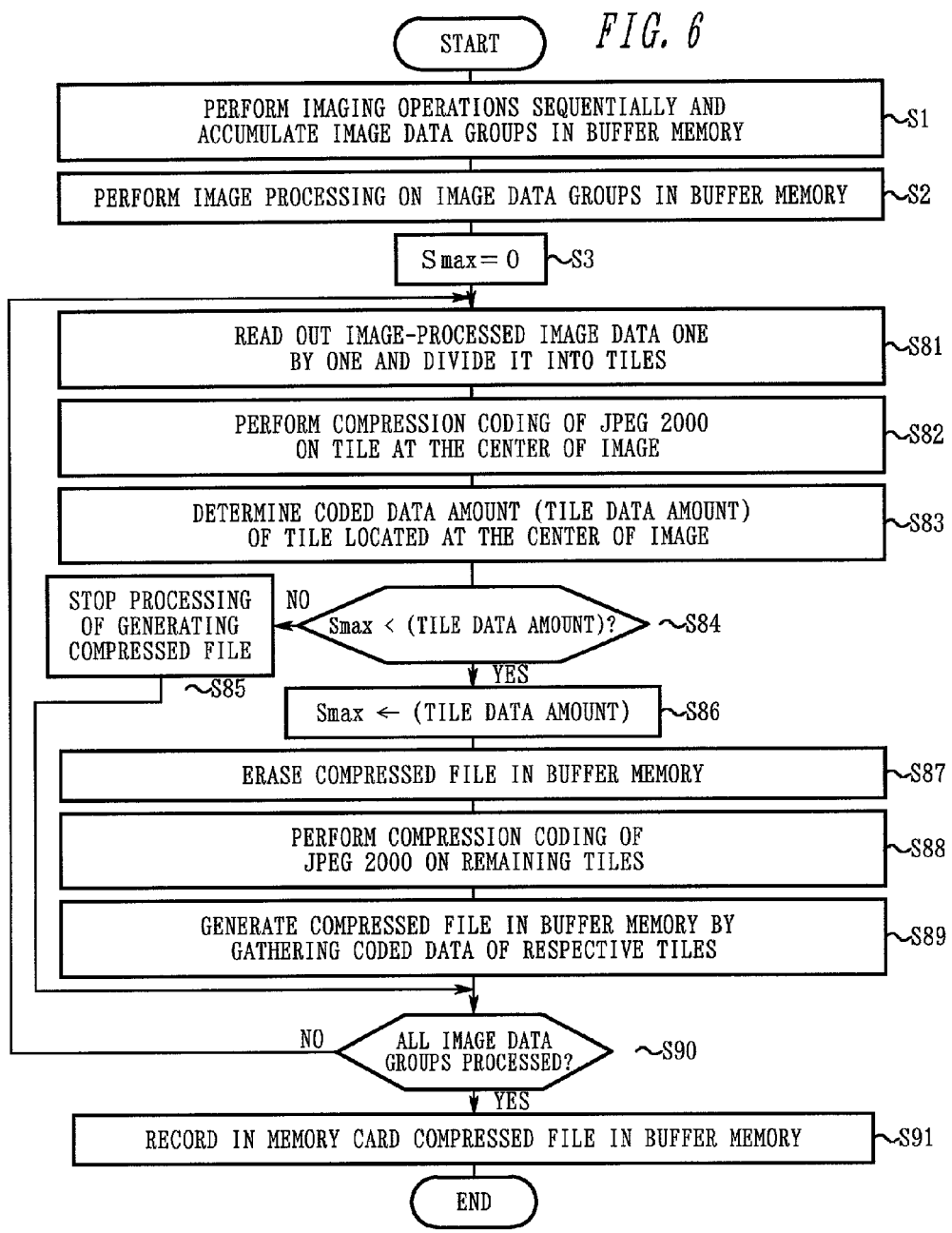

FIG. 6 is a flowchart showing a fifth BSS mode process. The fifth BSS mode process will be described below in order of step numbers shown in FIG. 6.

Steps S1–S3: Steps S1–S3 are the same as in the first BSS mode process (FIG. 2) and hence will not be described.

Step S81: The image evaluation section 34 instructs the image coding section 18 to perform coding processing on a tile-by-tile basis. In response to this instruction, the tile dividing section 20 reads image data that have been subjected to the two-dimensional image processing from the sequential shooting buffer 16, in every processing. The tile dividing section 20 divides the image data into tiles.

Step S82: The individual processing sections 21–27 of the image coding section 18 select a file located at the center of the image preferentially and perform compression coding that is prescribed by JPEG 2000 on it.

Step S83: The image evaluation section 34 acquires, from the image coding section 18, indicating a coded data amount (hereinafter referred to as "tile data amount") of the tile located at the center of the image.

Step S84: The image evaluation section 34 compares the tile data amount with the evaluation reference value Smax.

If the tile data amount is smaller than or equal to the evaluation reference value Smax, the image evaluation section 34 proceeds to step S85.

On the other hand, if the tile data amount is larger than the evaluation reference value Smax, the image evaluation section 34 proceeds to step S86.

Step S85: The image evaluation section 34 judges that the image is a defective image, because the tile data amount of the image data being under compression is small. The image evaluation section 34 instructs the image coding section 18 to stop the processing of generating a compressed file. In response to the stop instruction, the image coding section 18 initializes the internal processing buffer (not shown) etc. to prepare for the next compression coding operation. After issuing the stop instruction, the image evaluation section 34 proceeds to step S90.

Step S86: The image evaluation section 34 judges that the image is a best image at this point, because the tile data amount of the image data being under compression is large. The image evaluation section 34 substitutes the tile image data amount into the evaluation reference value Smax to prepare for the next evaluation.

Step S87: Since the new best image has occurred, the image evaluation section 34 erases or invalidates the compressed file (e.g., the past best image) in the buffer memory 31. Alternatively, the lowest-rank compressed file may be removed from a predetermined number of compressed files in the buffer memory 31.

Step S88: The image coding section 18 performs the compression coding prescribed by JPEG 2000 on the remaining files in order.

Step S89: The image coding section 18 generates a compressed file in the buffer memory 31 by arranging coded data of the respective files in predetermined order.

Step S90: The image evaluation section 34 judges whether the evaluation operation has completed for all the image data groups in the sequential shooting buffer 16.

If the evaluation operation has not completed yet for all the image data groups, the image evaluation section 34 returns to step S81.

On the other hand, if the evaluation operation has completed for all the image data groups, the image evaluation section 34 proceeds to step S91.

Step S91: The image evaluation section 34 instructs the recording section 32 to perform recording processing on the compressed file existing in the buffer memory 31. The recording section 32 stores, in the memory card 33, the compressed file (i.e., the surviving, high-rank image) existing in the buffer memory 31.

The fifth BSS mode process completes after execution of the above series of steps.

Advantages of Embodiments

The above-described first BSS mode makes it possible to judge the quality of each image data based on its ROI data amount and thereby select and store high-quality image data.

The second BSS mode makes it possible to judge the quality of each image data based on its interim data amount and thereby select and store high-quality image data.

The third BSS mode makes it possible to judge the quality of each image data based on its cutoff position and thereby select and store high-quality image data.

The fourth BSS mode makes it possible to judge the quality of each image data based on the signal level of its high-frequency range sub-band and thereby select and store high-quality image data.

The fifth BSS mode makes it possible to judge the quality of each image data based on its tile data amount and thereby select and store high-quality image data.

In the first to fifth BSS modes, the processing of generating a compressed file stops immediately when the image evaluation section 34 has judged that the image data being under compression should not be selected. This makes it possible to prevent performance of useless compression processing and thereby increase the processing speed of a BSS mode operation.

Supplements to Embodiments

The above embodiments are directed to the electronic camera 11. However, the invention is not limited to such a case. For example, an image processing program for causing a computer to perform the same BSS operation as any of the BSS operations described in the above embodiments may be produced.

In this case, for example, the computer may acquire image data groups produced by sequential shooting from an electronic camera or the like via a storage medium or a communication medium. The above-described image evaluation section 34 may be implemented as software processing of the computer. Further, the image coding section 18 may be implemented as software processing of the computer or by the computer's software-controlling an IC dedicated to compression coding.

The above-described first to fourth BSS mode processes are directed to the case that compression coding is performed in a state that tile division is not performed. However, the invention is not limited to such a case. For example, image data is divided into tiles and the image evaluation section 34 performs the quality evaluation of any of the first to fourth BSS modes on a predetermined tile. In this case, since the quality evaluation is completed sometime during compression coding of the predetermined tile, the processing speed of a BSS mode operation can further be increased.

In each of the above first to fifth BSS mode processes, an image is evaluated based on an independent evaluation result. However, the invention is not limited to such a case. More accurate image evaluation is attained by combining evaluation results of the first to fifth BSS mode processes as appropriate. For example, image evaluation may be performed in a comprehensive manner by weighting such evaluation results. As a further example, when evaluation results of one kind provide no significant difference, evaluation results of another kind may be used.

The invention is not limited to the above embodiments and various modifications may be made without departing from the spirit and the scope of the invention. Any improvement may be made in part or all of the components.

What is claimed is:

1. An electronic camera comprising:
   an imaging section for generating a plurality of image data by shooting an object sequentially;
   a frequency dividing section for frequency-dividing each of the plurality of image data generated by said imaging section to convert the image data into transform coefficients;
   a coding section for dividing the transform coefficients into transform coefficients in a selection region and transform coefficients in a non-selection region, and for generating a compressed file by allocating an information amount preferentially to the selection region to the non-selection region and coding the transform coefficients in the selection region, the selection region being a region determined in advance in an image, the non-selection region being a region other than the selection region;
   an image evaluation section for comparing data amounts (ROI data amounts) of the coded transform coefficients in the selection region for the plurality of image data, and for selecting image data having a large ROI data amount; and
   a recording section for recording the compressed file of the image data selected by said image evaluation section.

2. The electronic camera according to claim 1, wherein upon deciding not to select image data being under evaluation, said image evaluation section allows said coding section to stop generating a compressed file of the image data being under evaluation.

3. The electronic camera according to claim 1, further comprising:
   a dividing section for dividing image data into a plurality of tiles,
   wherein said image evaluation section compares at least one predetermined tile of the plurality of tiles divided by said dividing section.

4. An electronic camera comprising:
an imaging section for generating a plurality of image data by shooting an object sequentially;
a frequency dividing section for frequency-dividing each of the plurality of image data generated by said imaging section to convert the image data into transform coefficients;
a coding section for coding the transform coefficients into coded data, and for generating a bit stream of a compressed file by arranging the coded data in a predetermined order of priority;
an image evaluation section for comparing amounts of data (interim data amounts) included in predetermined starting positions to predetermined positions of the generated bit streams for the plurality of image data, and for selecting image data having a large interim data amount; and
a recording section for recording the compressed file of the image data selected by said image evaluation section.

5. The electronic camera according to claim 4, wherein upon deciding not to select image data being under evaluation, said image evaluation section allows said coding section to stop generating a compressed file of the image data being under evaluation.

6. The electronic camera according to claim 4, further comprising:
a dividing section for dividing image data into a plurality of tiles,
wherein said image evaluation section compares at least one predetermined tile of the plurality of tiles divided by said dividing section.

7. An electronic camera comprising:
an imaging section for generating a plurality of image data by shooting an object sequentially;
a frequency dividing section for frequency-dividing each of the plurality of image data generated by said imaging section to convert the image data into transform coefficients;
a coding section for coding the transform coefficients into coded data, and for generating a bit stream of a compressed file by arranging the coded data in a predetermined order of priority and cutting off the bit stream according to a target data amount;
an image evaluation section for comparing cutoff positions of the generated bit streams for the plurality of image data, and for selecting image data whose bit stream has been cut off at a position close to the beginning of the bit stream; and
a recording section for recording the compressed file of the image data selected by said image evaluation section.

8. The electronic camera according to claim 7, wherein upon deciding not to select image data being under evaluation, said image evaluation section allows said coding section to stop generating a compressed file of the image data being under evaluation.

9. The electronic camera according to claim 7, further comprising:
a dividing section for dividing image data into a plurality of tiles,
wherein said image evaluation section compares predetermined at least one tile of the plurality of tiles divided by said dividing section.

10. An electronic camera comprising:
an imaging section for generating a plurality of image data by shooting an object sequentially;
a frequency dividing section for dividing each of the plurality of image data generated by said imaging section into sub-bands to convert the image data into transform coefficients;
a coding section for generating a compressed file by coding the transform coefficients;
an image evaluation section for comparing signal levels in high-frequency-range sub-bands of the transform coefficients for the plurality of image data, and for selecting image data having a high signal level; and
a recording section for recording the compressed file of the image data selected by said image evaluation section.

11. The electronic camera according to claim 10, wherein upon deciding not to select image data being under evaluation, said image evaluation section allows said coding section to stop generating a compressed file of the image data being under evaluation.

12. The electronic camera according to claim 10, further comprising:
a dividing section for dividing image data into a plurality of tiles,
wherein said image evaluation section compares at least one predetermined tile of the plurality of tiles divided by said dividing section.

13. An electronic camera comprising:
an imaging section for generating a plurality of image data by shooting an object sequentially;
a frequency dividing section for dividing each of the plurality of image data generated by said imaging section into a plurality of tiles in an image space, and for frequency-dividing the tiles to be converted into transform coefficients;
a coding section for generating coded data by coding the transform coefficients and for generating a compressed file by gathering the coded data of the tiles;
an image evaluation section for comparing coded data amounts (tile data amounts) of predetermined tiles for the plurality of image data, and for selecting image data having a large tile data amount; and
a recording section for recording the compressed file of the image data selected by said image evaluation section.

14. The electronic camera according to claim 13, wherein upon deciding not to select image data being under evaluation, said image evaluation section allows said coding section to stop generating a compressed file of the image data being under evaluation.

15. An image processing program recorded on a computer readable recording medium for processing with a computer a plurality of image data generated by sequential shooting by an imaging section, said image processing program comprising:
instructions for generating a plurality of image data by shooting an object sequentially;
instructions for frequency-dividing each of the plurality of image data generated by said instructions for generating to convert the image data into transform coefficients;
instructions for dividing the transform coefficients into transform coefficients in a selection region and transform coefficients in a non-selection region, and for generating a compressed file by allocating an information amount preferentially to the selection region to the non-selection region and coding the transform coefficients in the selection region, the selection region being a region determined in advance in an image, the non-selection region being a region other than the selection region;

instructions for comparing data amounts (ROI data amounts) of the coded transform coefficients in the selection region for the plurality of image data, and for selecting image data having a large ROI data amount; and instructions for recording the compressed file of the image data selected by said instructions for comparing.

16. The image processing program according to claim 15, wherein upon deciding not to select image data being under evaluation, said instructions for comparing allows said instructions for dividing to stop generating a compressed file of the image data being under evaluation.

17. The image processing program according to claim 15, further comprising:

instructions for dividing image data into a plurality of tiles, wherein said instructions for comparing compares at least one predetermined tile of the plurality of tiles divided by said instructions for dividing.

18. An image processing program recorded on a computer readable recording medium for processing with a computer a plurality of image data generated by sequential shooting by an imaging section, said image processing program comprising:

instructions for generating a plurality of image data by shooting an object sequentially;

instructions for frequency-dividing each of the plurality of image data generated by said instructions for generating to convert the image data into transform coefficients;

instructions for coding the transform coefficients into coded data, and for generating a bit stream of a compressed file by arranging the coded data in a predetermined order of priority;

instructions for comparing amounts of data (interim data amounts) included in predetermined starting positions to predetermined positions of the generated bit streams for the plurality of image data, and for selecting image data having a large interim data amount; and instructions for recording the compressed file of the image data selected by said instructions for comparing.

19. The image processing program according to claim 18, wherein upon deciding not to select image data being under evaluation, said instructions for comparing allows said instructions for coding to stop generating a compressed file of the image data being under evaluation.

20. The image processing program according to claim 18, further comprising:

instructions for dividing image data into a plurality of tiles, wherein said instructions for comparing compares at least one predetermined tile of the plurality of tiles divided by said instructions for dividing.

21. An image processing program recorded on a computer readable recording medium for processing with a computer a plurality of image data generated by sequential shooting by an imaging section, said image processing program comprising:

instructions for generating a plurality of image data by shooting an object sequentially;

instructions for frequency-dividing each of the plurality of image data generated by said instructions for generating to convert the image data into transform coefficients;

instructions for coding the transform coefficients into coded data, and for generating a bit stream of a compressed file by arranging the coded data in a predetermined order of priority and cutting off the bit stream according to a target data amount;

instructions for comparing cutoff positions of the generated bit streams for the plurality of image data, and for selecting image data whose bit stream has been cut off at a position close to the beginning of the bit stream; and instructions for recording the compressed file of the image data selected by said instructions for comparing.

22. The image processing program according to claim 21, wherein upon deciding not to select image data being under evaluation, said instructions for comparing allows said instructions for coding to stop generating a compressed file of the image data being under evaluation.

23. The image processing program according to claim 21, further comprising:

instructions for dividing image data into a plurality of tiles, wherein said instructions for comparing compares at least one predetermined tile of the plurality of tiles divided by said instruction for dividing.

24. An image processing program recorded on a computer readable recording medium for processing with a computer a plurality of image data generated by sequential shooting by an imaging section, said image processing program comprising:

instructions for generating a plurality of image data by shooting an object sequentially;

instructions for dividing each of the plurality of image data generated by said instructions for generating the plurality of image data into sub-bands to convert the image data into transform coefficients;

instructions for generating a compressed file by coding the transform coefficients;

instructions for comparing signal levels in high-frequency-range sub-bands of the transform coefficients for the plurality of image data, and for selecting image data having a high signal level; and instructions for recording the compressed file of the image data selected by said instructions for comparing.

25. The image processing program according to claim 24, wherein upon deciding not to select image data being under evaluation, said instructions for comparing allows said instructions for generating the compressed file to stop generating a compressed file of the image data being under evaluation.

26. The image processing program according to claim 24, further comprising:

instructions for dividing image data into a plurality of tiles, wherein said instructions for comparing compares at least one predetermined tile of the plurality of tiles divided by said instructions for dividing.

27. An image processing program recorded on a computer readable recording medium for processing with a computer a plurality of image data generated by sequential shooting by an imaging section, said image processing program comprising:

instructions for generating a plurality of image data by shooting an object sequentially;

instructions for dividing each of the plurality of image data generated by said instructions for generating the plurality of image data into a plurality of tiles in an image space, and for frequency-dividing the tiles to be converted into transform coefficients;

instructions for generating coded data by coding the transform coefficients and for generating a compressed file by gathering the coded data of the tiles;

instructions for comparing coded data amounts (tile data amounts) of predetermined tiles for the plurality of image data, and for selecting image data having a large tile data amount; and instructions for recording the compressed file of the image data selected by said instructions for comparing.

28. The image processing program according to claim 27, wherein upon deciding not to select image data being under evaluation, said instructions for comparing allows said instructions for generating the coded data and the compressed file to stop generating a compressed file of the image data being under evaluation.

* * * * *